(12) United States Patent
Urushihara et al.

(10) Patent No.: US 6,688,293 B2
(45) Date of Patent: Feb. 10, 2004

(54) SYSTEM AND METHOD FOR AUTO-IGNITION SUPPORT

(75) Inventors: Tomonori Urushihara, Yokohama (JP); Koichi Yamaguchi, Yokohama (JP); Kazuya Hasegawa, Tokyo (JP); Koudai Yoshizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 141 days.

(21) Appl. No.: 10/094,970

(22) Filed: Mar. 12, 2002

(65) Prior Publication Data

US 2002/0129798 A1 Sep. 19, 2002

(30) Foreign Application Priority Data

Mar. 13, 2001 (JP) ........................................ 2001-070201

(51) Int. Cl.[7] ................................................ F02B 47/08
(52) U.S. Cl. .............................. 123/568.13; 123/568.21
(58) Field of Search ....................... 123/568.13, 568.11, 123/568.19, 568.21

(56) References Cited

U.S. PATENT DOCUMENTS

| | | | |
|---|---|---|---|
| 4,389,981 A | * | 6/1983 | Meyer ............................ 123/3 |
| 5,622,145 A | | 4/1997 | Hara ......................... 123/90.16 |
| 5,669,343 A | | 9/1997 | Adachi ...................... 123/90.17 |
| 5,785,016 A | | 7/1998 | Enderle et al. ........... 123/90.11 |
| 5,836,276 A | | 11/1998 | Iwasaki et al. ........... 123/90.17 |
| 6,497,213 B2 | * | 12/2002 | Yoshizawa et al. ......... 123/299 |
| 6,564,785 B2 | * | 5/2003 | Iwasaki .................. 123/568.21 |

FOREIGN PATENT DOCUMENTS

| | | |
|---|---|---|
| JP | 9-203307 | 8/1997 |
| JP | 11-343874 | 12/1999 |

OTHER PUBLICATIONS

U.S. patent application Ser. No. 09/853,702, Yoshizawa et al., filed May 14, 2001.

* cited by examiner

Primary Examiner—Bibhu Mohanty
(74) Attorney, Agent, or Firm—Foley & Lardner

(57) ABSTRACT

An internal combustion engine includes a cylinder including at least one intake valve which is selectively open to allow at least air to enter the cylinder and at least one exhaust valve which is selectively open to allow residual gas escape from the cylinder after a firing event. An auto-ignition system for such an engine comprises a device communicably coupled with the cylinder. The device is, effective to allow an amount of high temperature and pressure residual gas to enter the cylinder in the compression stroke of an engine cycle after valve closure of the intake valve.

18 Claims, 10 Drawing Sheets

SYSTEM AND METHOD FOR AUTO-IGNITION SUPPORT

BACKGROUND OF THE INVENTION

1. Field of the Invention

The present invention relates to an auto-ignition support system and method for internal combustion engines including heterogeneous-charge, compression-ignition four-cycle engines and homogeneous-charge compression-ignition four-cycle engines.

2. Description of the Background Art

It is known practice to design four-stroke cycle internal combustion engines to accommodate auto-ignition (or compression-ignition) combustion. It is proposed to control auto-ignition timing by changing the temperature of fresh charge of air and fuel mixture by heating the intake air. It is also proposed by JP-A 11-343874 to use heat energy of a portion of residual gas escaped from cylinder in the power stroke of one engine cycle to heat fresh charge of the subsequent engine cycle.

Although it is possible to control auto-ignition timing by heating fresh charge using the heat energy of residual gas of the preceding engine cycle, a need remains for improvement of system and method for auto-ignition support for practical application to internal combustion engines.

SUMMARY OF THE INVENTION

An object of the present invention is to provide auto-ignition support system and method for four-stroke cycle internal combustion engines to meet the above-mentioned need.

According to one aspect of the present invention, there is provided an auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:

a device communicably coupled with the cylinder, effective to allow an amount of gas to enter the cylinder in the compression stroke of an engine cycle after valve closure of the intake valve, said gas being higher in temperature than the air that is allowed to enter the cylinder when the intake valve is open.

According to another aspect of the present invention, there is provided an auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:

a gas trap including a trap valve, and a trap chamber selectively communicable with the cylinder through a port when said trap valve is open; and a valve actuator which selectively actuates said trap valve, said valve actuator being effective to selectively open said trap valve to allow escape of a portion of residual gas from the cylinder to said trap chamber in the power stroke of one engine cycle before valve opening angle of the exhaust valve and to trap said portion of residual gas escaped from the cylinder, said valve actuator being further effective to selectively open said trap valve to allow said trapped portion of residual gas to enter the cylinder in the compression stroke of the subsequent engine cycle after valve closure of the intake valve.

According to still another aspect of the present invention, there is provided an auto-ignition support method for an internal combustion engine including a cylinder including at least one intake valve which is selectively open to allow at least air to enter the cylinder and at least one exhaust valve which is selectively open to allow residual gas escape from the cylinder after a firing event, the method comprising:

for one engine cycle, allowing escape of a portion of residual gas from the cylinder during the power stroke before the exhaust valve is open;

trapping said portion of residual gas escaped from the cylinder; and for the subsequent engine cycle, allowing said trapped portion of residual gas to enter the cylinder in the compression stroke after valve closure of the intake valve.

BRIEF DESCRIPTION OF THE DRAWINGS

Further objects and advantages of the invention will be apparent from reading of the following description in conjunction with the accompanying drawings.

DETAILED DESCRIPTION OF THE INVENTION

Figure 1:
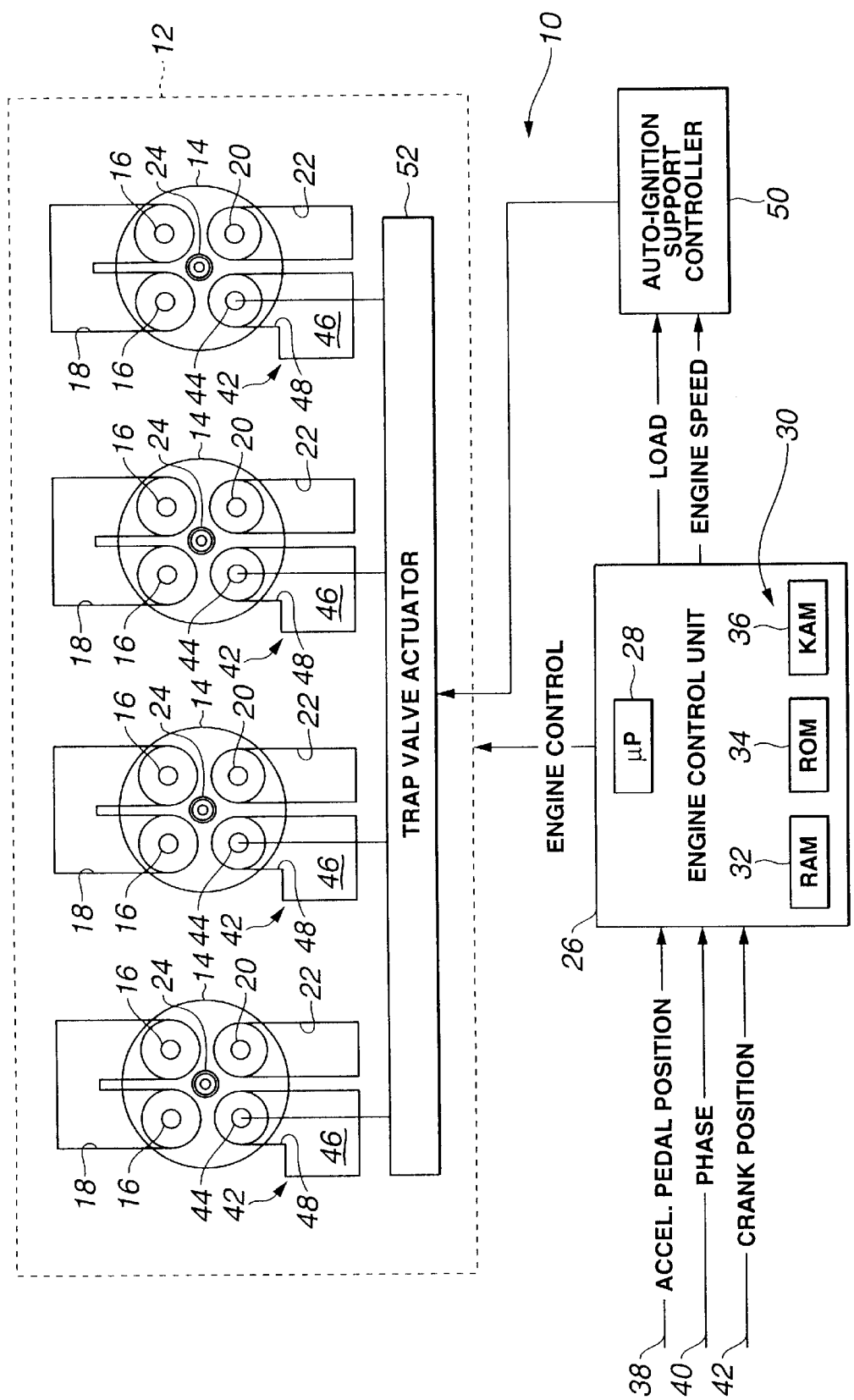
FIG. 1 is block diagram of an exemplary embodiment.
Figure 2:
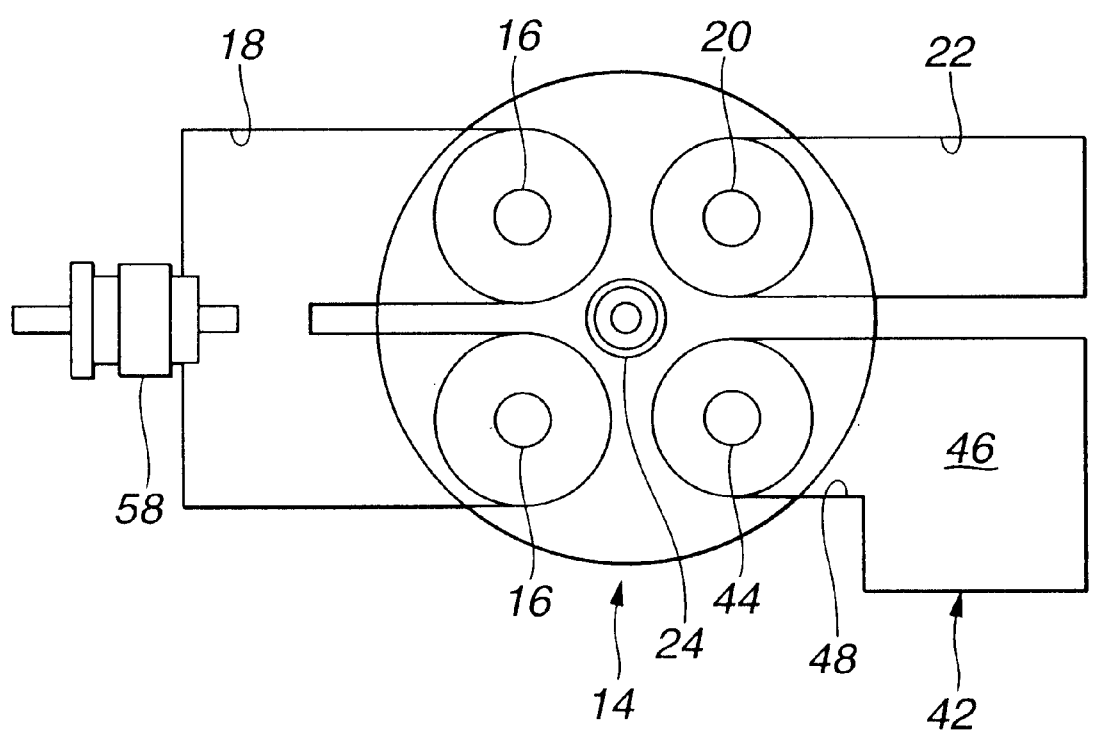
FIG. 2 is a fragmentary view of FIG. 1.

Referring to FIGS. 1 and 2, there is shown an auto-ignition support system 10 which is made and utilized in accordance with the teachings of the exemplary embodiment of the present invention in order to ensure auto-ignition in each of cylinders of an engine. Particularly, system 10 is adapted for use in auto-ignition within an internal combustion engine 12 including several substantially identical cylinders 14. Each cylinder 14 includes at least one intake valve 16, which is selectively open to allow at least air to enter the cylinder through intake port 18, a fuel injector, not illustrated, positioned to inject fuel directly into the cylinder, at least one exhaust valve 20, which is selectively open to allow residual or exhaust gas escape from the cylinder through exhaust port after a firing event of air and fuel mixture, a spark plug 24, and a conventional piston, not illustrated, slidably disposed within cylinder 14. While, a four-stroke cycle internal combustion engine having four cylinders is illustrated in FIG. 1, it should be appreciated that the present system 10 may be used in combination with other types of engines having different numbers of cylinders and/or valves.

Engine 12 further includes a conventional engine control unit 26, which includes a microprocessor-based controller generally represented by reference numeral 28. The microprocessor 28 communicates with the associated computer-readable storage media 30. As will be appreciable by one of ordinary skill in the art, computer-readable storage media 30 may include various devices for storing data representing instructions executable by the microprocessor to control the engine. For example, computer-readable storage media may include a random access memory (RAM) 32, a read-only memory (ROM) 34, and/or a keep-alive memory (KAM) 36. These functions may be carried out through any one of a number of known physical devices including EPROM, EEPROM, flash memory, and the like. Engine control unit 26 also includes appropriate electronic circuitry, integrated circuits, and the like to carry out control of the engine. As such, engine control unit 26 is used to carry out control logic implemented in terms of software (instructions) and or hardware components. Details of control logic implemented by engine control unit 26 are readily derivable as the discussion proceeds.

Engine control unit 26 receives various signals from sensors, switches, and other input devices to monitor current operating conditions of the vehicle. For example, signals may include an accelerator pedal position signal 38, a phase signal 40, and a crank position signal 42. As will be appreciable by one of ordinary skill in the art, engine control unit 26 determines load and engine speed based on some of such signals.

As will be appreciated as the discussion proceeds, auto-ignition support system 10 includes a device communicably coupled with each cylinder 14, effective to allow an amount of gas to enter the cylinder in the compression stroke of each engine cycle after valve closure of the associated intake valve 16. The gas is higher in temperature than the intake air that is allowed to enter cylinder 14 when intake valve 16 is open.

In one exemplary embodiment of the present invention, system 10 includes several substantially identical gas traps 42. Each gas trap 42 includes a trap valve 44, and a trap chamber 46 selectively communicable with one of cylinders 14 through a communication port 48 when trap valve 44 is open. While four gas traps 42 are illustrated in FIG. 1, communicably coupled with four cylinders 14, respectively, the present auto-ignition support system 10 may use a gas trap including trap valves for the respective cylinders, and a common rail trap chamber selectively communicable with selected one of the cylinders through one of communication ports when the associated trap valve is open.

In the embodiment, system 10 also includes an auto-ignition support controller 50, and, for each cylinder 14, a valve actuator illustrated by a block 52 in FIG. 1, which selectively actuates the associated one trap valve 44. In the embodiment, controller 50 comprises a portion of engine control unit 26. In one alternate embodiment, controller 50 is a conventional controller including one or more microprocessors. In other alternate embodiments, controller 50 is externally coupled to engine control unit 26. Controller 50 is communicably coupled to trap valve actuator 52, effective to selectively communicate a control signal to valve actuator 52. As discussed more fully and completely below, controller 50 includes one or more valve timing strategies, which it uses to control the timing of the trap valves 44.

Actuator 52 for each trap valve 44 is an electromagnetic valve that receives a control signal from controller 50. An example of such electromagnetic valve is shown in U.S. Pat. No. 5,785,016 issued Jul. 28, 1998 to Enderle et al. In one alternate embodiment, actuator 52 comprises an electrohydraulic actuator. In another alternate embodiment, actuator 52 comprises a rocker arm with a free cam follower that is operated by a cam on a camshaft driven by the engine crankshaft. When engaged by a lock lever, the rocker arm is in driving engagement with the free cam follower to actuate trap valve 44. An example of such a rocker arm is disclosed in U.S. Pat. No. 5,622,145 issued Apr. 22, 1977 to Hara, which is hereby incorporated by reference in its entirety.

Figure 3:
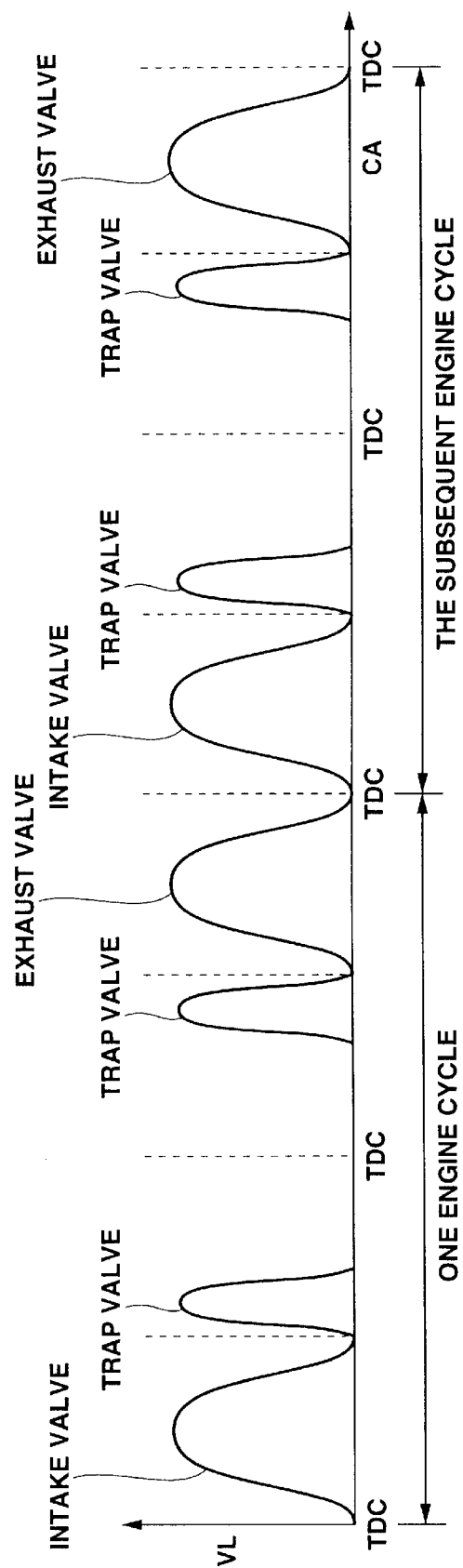
FIG. 3 is a valve lift diagram of an intake valve, an exhaust valve and a trap valve over one engine cycle and the subsequent engine cycle when the engine is operable in an auto-ignition combustion operating region of a load and engine speed relationship.
Figure 5A:
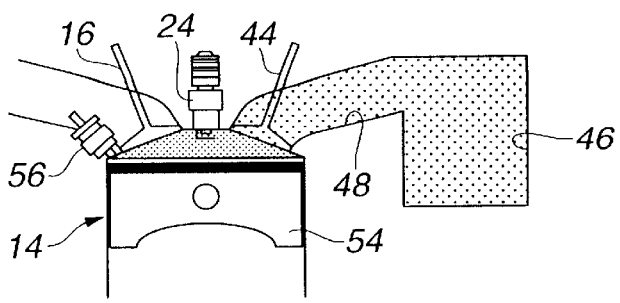
FIGS. 5(A) to 5(E) are pictorial views illustrating five phases beginning with the power stroke of one engine cycle and ending with early part of the compression stroke of the subsequent engine cycle when the engine is operable in auto-ignition combustion operating region.
Figure 5B:
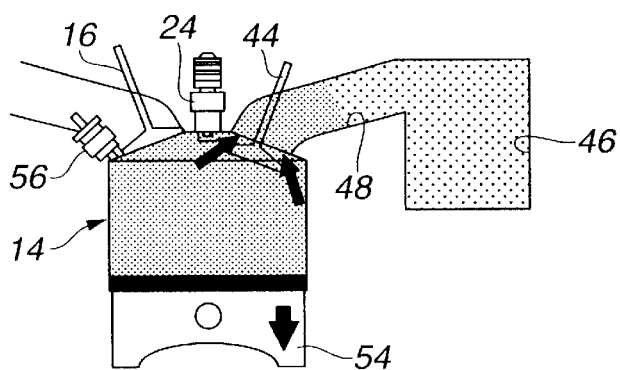
Figure 5C:
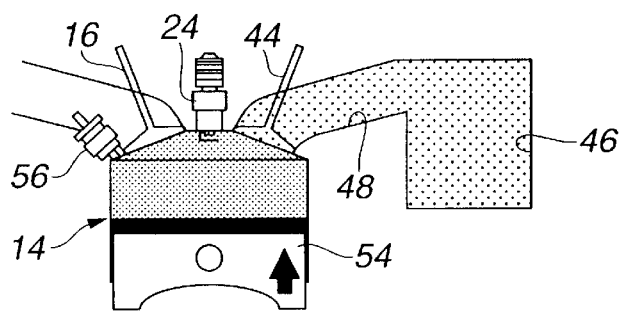
Figure 5D:
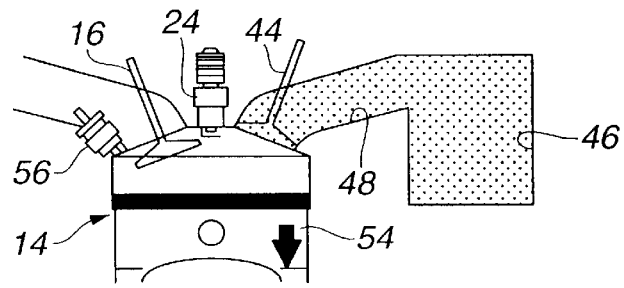
Figure 5E:
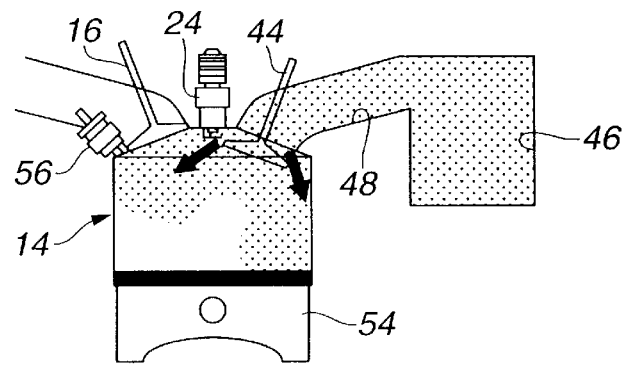

With reference to FIGS. 3 and 5(B), in the embodiments, actuator 52 is effective to selectively open trap valve 44 to allow escape of a portion of residual gas from cylinder 14 to trap chamber 46 in the power stroke of each engine cycle after a firing event of air and fuel mixture and before valve opening angle of exhaust valve 20. The portion of residual gas is trapped or kept in trap chamber 46. With reference to FIGS. 3 and 5(E), actuator 52 is further effective to selectively open trap valve 44 to allow the trapped portion of residual gas to enter cylinder 14 in the compression stroke of the subsequent engine cycle after valve closure of intake valve 16. It should be noted that trap valve 44 opens after valve closure of intake valve 16 in the compression stroke of each engine cycle for effective transfer of heat of the residual gas from the preceding engine cycle to a fresh charge of air and fuel mixture without causing any reduction, in mass, of supply of fresh charge to cylinder 14. In this manner, the temperature of the charge of air and fuel mixture within cylinder 14 is held high enough to initiate auto-ignition. No spark ignition is necessary when engine 12 is operating in a specified operating region, namely, an auto-ignition combustion operating region of the different load and engine speed relationships (see FIG. 10). When the load of the engine increases and/or the engine speed increases, auto-ignition combustion becomes unacceptable. Engine 12 then may operate under high load conditions with conventional spark ignition combustion. To avoid knocking when the engine operates in a spark-ignition combustion operating region (see FIG. 10), the temperature of charge of air and fuel within cylinder 14 should be as low as possible. To reduce temperature of air and fuel mixture within cylinder 14, actuator 52 deactivates trap valve 44, holding it closed.

Figure 4:
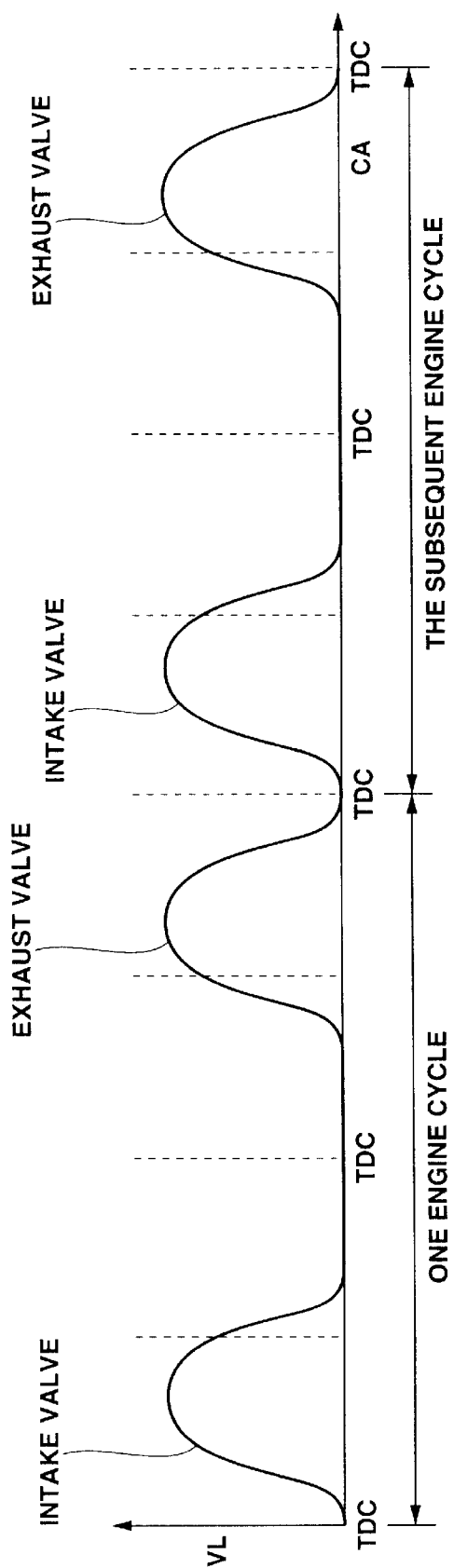
FIG. 4 is a valve lift diagram over one engine cycle and the subsequent engine cycle of the one cylinder when the engine is operable in a spark-ignition combustion region of a load and engine speed relationship.

When the combustion mode is switched from the auto-ignition combustion mode to spark-ignition combustion mode, intake and exhaust valves 16, 20 are actuated with valve timing and lift for spark-ignition combustion mode. FIG. 4 shows one example of a valve lift and timing diagram for spark-ignition combustion mode. FIG. 3 shows one example of a valve lift and timing diagram for auto-ignition combustion mode. To actuate intake exhaust valves 16, 20 in varying valve timings with different combustion modes as illustrated in FIGS. 3 and 4, various actuators are available and employed. One such example is an actuator including a phase shifter that can vary the valve timing by varying the rotational phase between a camshaft and the engine crankshaft as disclosed in U.S. Pat. No. 5,669,343 issued Sep. 23, 1997 to Adachi and U.S. Pat. No. 5,836,276 issued Nov. 17, 1998. Another example is an actuator including two different cams on a single camshaft and a rocker arm with a cam follower cooperating with one of the two cams and a free cam follower cooperating with the other cam. The actuator of this kind is disclosed in the already incorporated U.S. Pat. No. 5,622,145.

With reference to FIGS. 5(A) to 5(E), there are shown five different phases which cylinder 14 experiences from a firing event of one engine cycle to the compression stroke of the subsequent engine cycle in auto-ignition combustion mode. In these Figures, cylinder 14 includes a piston 54 and a fuel injector 56. As illustrated, fuel injector 56 is positioned to directly inject fuel into cylinder 14. If direct cylinder fuel injection is not required, cylinder 14 may include a fuel injector 58 positioned to inject fuel into intake port 18 as illustrated in FIG. 2.

In the embodiments, compression ratios within cylinders 14 are held not exceeding 12 to ensure engine operation on gasoline fuel in spark-ignition combustion mode. FIG. 5(A) illustrates a firing event due to auto-ignition at or near the compression top dead center position of piston 54 of one engine cycle. FIG. 5(B) illustrates a last portion of the power or expansion stroke of the engine cycle when trap valve 44 is open, showing escape of a portion of residual gas, indicated by the illustrated condensed distribution of dots, from cylinder 14 toward trap chamber 46. As is readily seen from FIG. 3, actuator 52 allows trap valve 44 to be closed before the valve valve opening angle of exhaust valve 20, trapping the portion of residual gas escaped from cylinder 14 within trap chamber 46. FIG. 5(C) illustrates the exhaust stroke of the engine cycle when exhaust valve 20 is open to allow residual gas escape from cylinder 14 through exhaust port 22 (see FIG. 1 or 2). FIG. 5(D) illustrates the induction stroke of the subsequent engine cycle when intake valve 56 is open, allowing at least air to enter cylinder 14 through intake port 18 (see also FIG. 1 or 2). FIG. 5(E) illustrates an initial portion of the compression stroke of the subsequent engine cycle when actuator 52 opens trap valve 44, allowing the trapped portion of residual gas to enter cylinder 14 as indicated by the illustrated less condensed distribution of dots. It is essential to the present invention that trap valve 44 be open in the compression stroke after the valve closure of intake valve 16 for effective transfer of energy from the trapped residual gas within trap chamber 46 to fresh charge of air and fuel mixture within cylinder 14 to control auto-ignition timing without any substantial reduction, in mass, of fresh charge of air and fuel. If trap valve 44 were open over the last portion of the induction stroke and the initial portion of the subsequent compression stroke, a reduction, in mass, of fresh charge of air and fuel would inevitably take place. The dependency of mass of fresh charge on the valve timing of trap valve 44 will be discussed later in connection with FIGS. 8(A) and 8(B).

With reference again to FIG. 5(E), the pressure of the cylinder content is elevated toward a level as high as the pressure within trap chamber 46 when trap valve 44 is open. Besides, the temperature of the cylinder content is elevated due to heat transfer from the trapped residual gas diffused out of trap chamber 46. The pressure and temperature of the cylinder content are further elevated due to adiabatic compression during the remaining portion of compression stroke and become high enough for auto-ignition at or near the compression top dead center.

Figure 6:
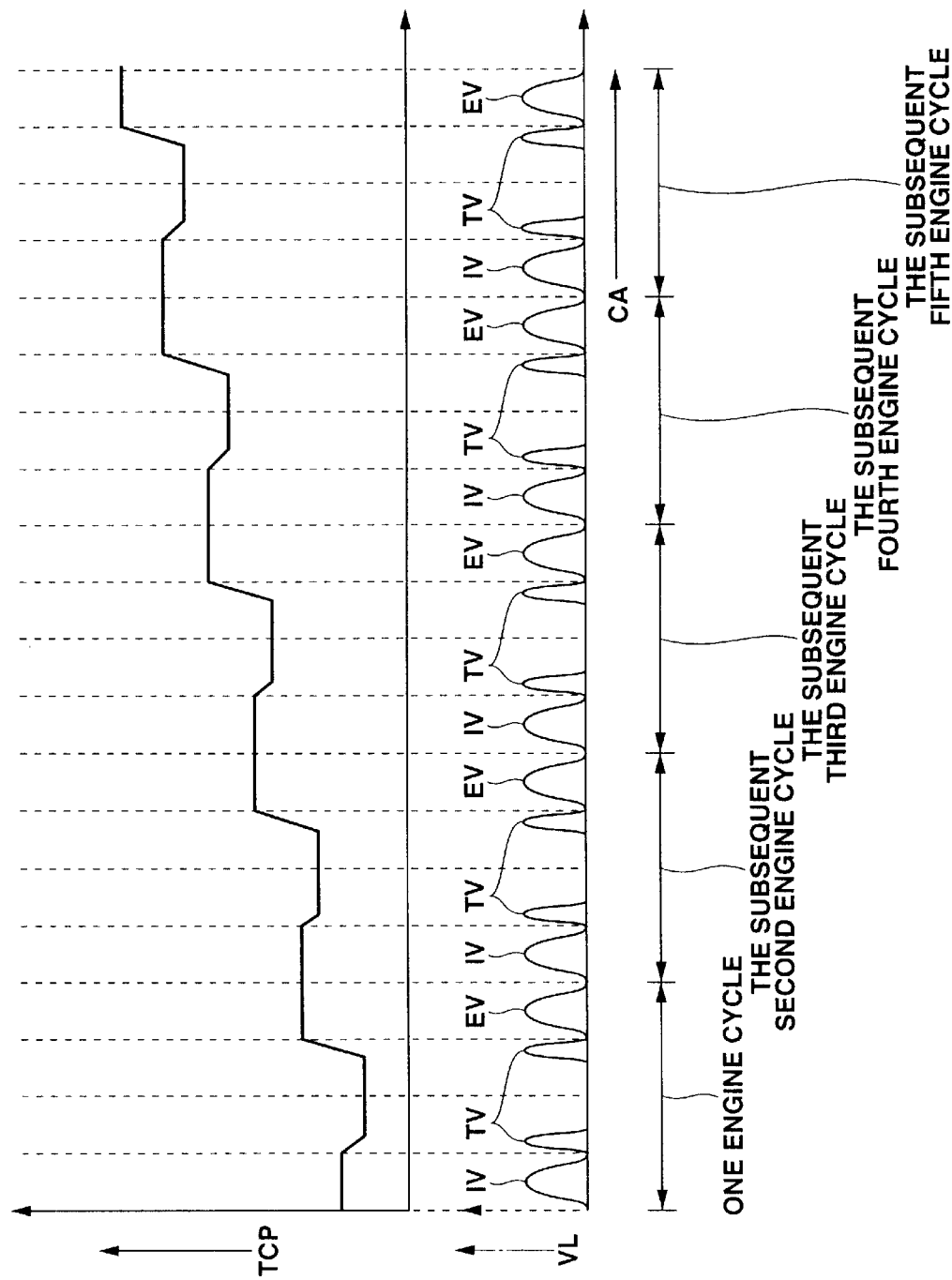
FIG. 6 shows the relationship between crank angle (CA) and trap chamber pressure (TCP) for six engine cycles together with a valve lift diagram immediately after initiation of engine operation in auto-ignition combustion operating region of a given fixed load and engine speed relationship.
Figure 7A:
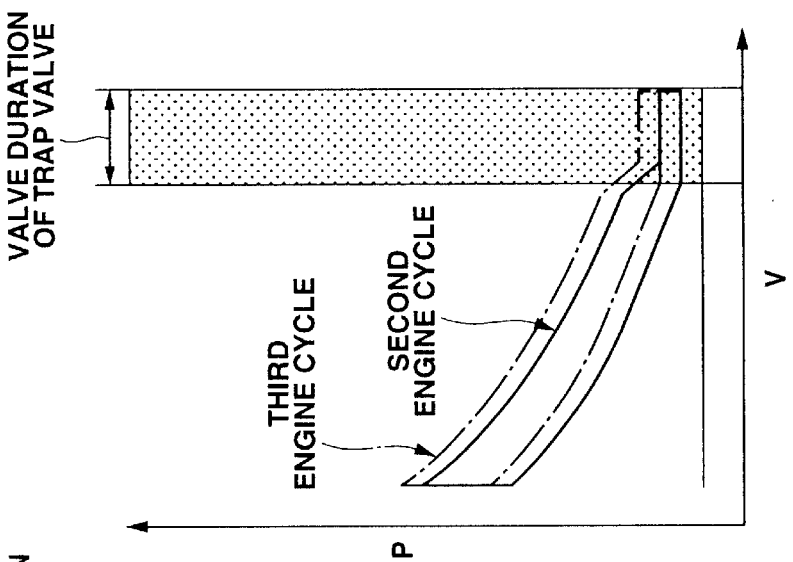
FIGS. 7(A) to 7(C) are P-V diagrams within trap chamber for three engine cycles immediately after initiation of engine operation in auto-ignition combustion operating region of the fixed load and engine speed relationship.
Figure 7B:
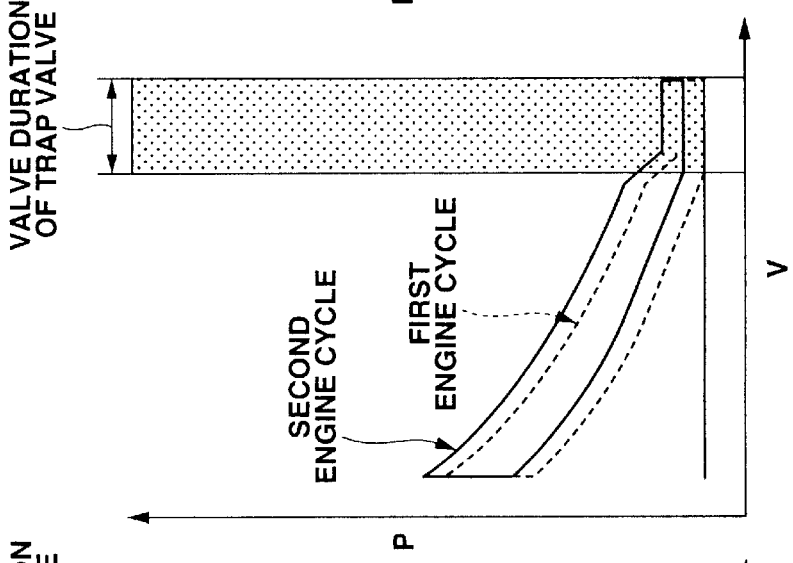
Figure 7C:
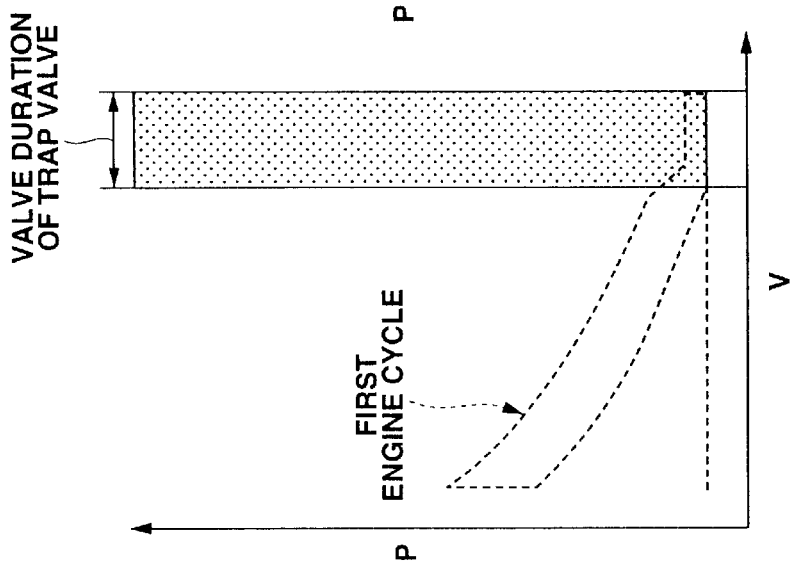

From the preceding description of the illustrated phases in FIGS. 5(A) to 5(E), it should be appreciated that the pressure within trap chamber 46, namely, trap chamber pressure (TCP), must be high enough to admit the trapped residual gas into cylinder 14 when trap valve 44 is open in the compression stroke. TCP is reliably predictable during engine operation in auto-ignition combustion operation region of a given load and engine speed relationship. FIG. 6 is a state diagram for TCP over six engine cycles immediately after initiation of engine operation in auto-ignition combustion operating region of a given fixed load and engine speed relationship, i.e., for one engine cycle and the subsequent second, third, fourth and fifth engine cycles. FIG. 7(A) is a P-V diagram within trap chamber 46 for the first engine cycle immediately after initiation of engine operation in auto-ignition combustion operation region of the fixed load and engine speed relationship. The valve duration of trap valve 44 when it opens in the compression stroke is indicated by the width of a vertical rectangle filled with dots. FIG. 7(B) is a P-V diagram within trap chamber 46 for the subsequent engine cycle together with that for the first engine cycle. FIG. 7(C) is a P-V diagram within trap chamber 46 for the subsequent third engine cycle together with that for the second engine cycle. It has been confirmed that TCP increases quickly to a sufficiently high level as high as 2 Kg/cm$^2$ after a transient period as illustrated in FIG. 6. The response of TCP change is quick enough to accommodate switch back from spark-ignition combustion mode to auto-ignition combustion mode.

With continuing reference to FIG. 6, the illustrated variation of TCP may be explained by a difference, in energy, between inflow of gas into and outflow of gas out of trap chamber 46. More specifically, an input to trap chamber 46 in the power stroke of one engine cycle is greater than an output from trap chamber 46 in the compression stroke of the subsequent engine cycle.

An increase in combustion rate with an increase in engine load is considerably great in auto-ignition combustion because bulk combustion takes place initiated simultaneously from many ignition sites within fresh charge of air and fuel mixture. When the engine load increases, combustion rate tends to increase due to the rich air and fuel mixture characteristic of an increased load even if tendency of auto-ignition to advance is restrained by reducing heat transfer to fresh charge of air and fuel mixture. Noise level becomes unacceptable when the combustion rate increases. To reduce an increase in combustion rate, a mass ratio G/F should be increased wherein G is the mass of the cylinder content, and F is the mass of fuel within the cylinder content. It has been confirmed that the upper limit of this ratio G/F is about 30 accounting for the acceptable noise level. This means that the useful auto-ignition combustion operating region of load and engine speed relationship may be expanded unless the above-mentioned limit is exceeded. In the embodiments according to the present invention, the mass of fresh charge within the cylinder content is unaffected and the mass of the cylinder content is increased by admission of trapped residual gas in the compression stroke of engine cycle. Accordingly, the auto-ignition combustion operating region may be expanded by increasing supply of fuel in response to an increased load demand.

Figure 8A:
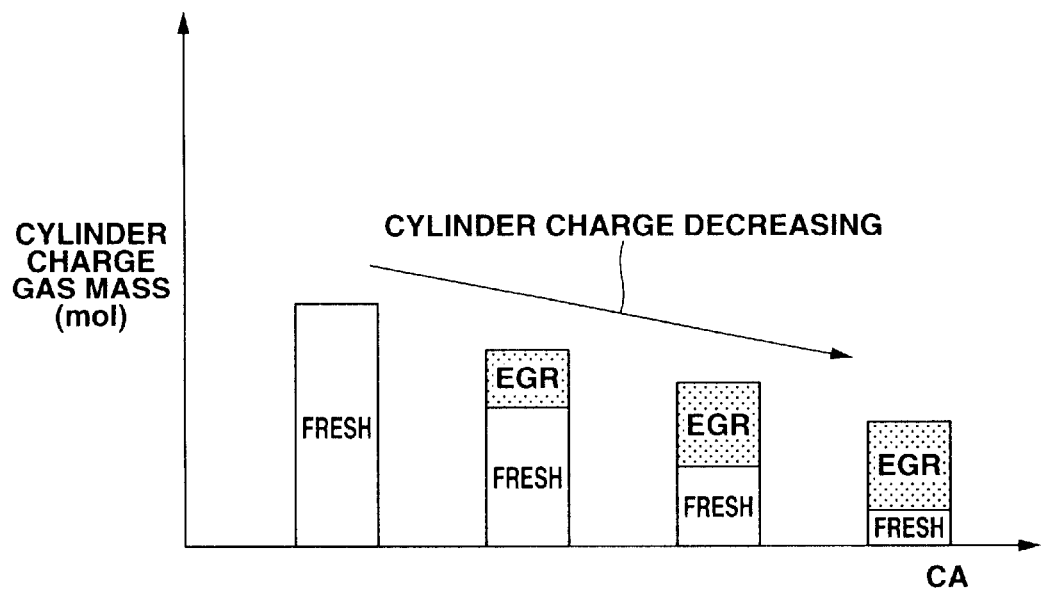
FIG. 8(A) shows the relationship between CA and cylinder charge mass (mol), graphically illustrating the trend of cylinder content for a number of engine cycles after initiation of auto-ignition combustion mode when trap valve is open over the last portion of induction stroke and the initial portion of the subsequent compression stroke.
Figure 8B:
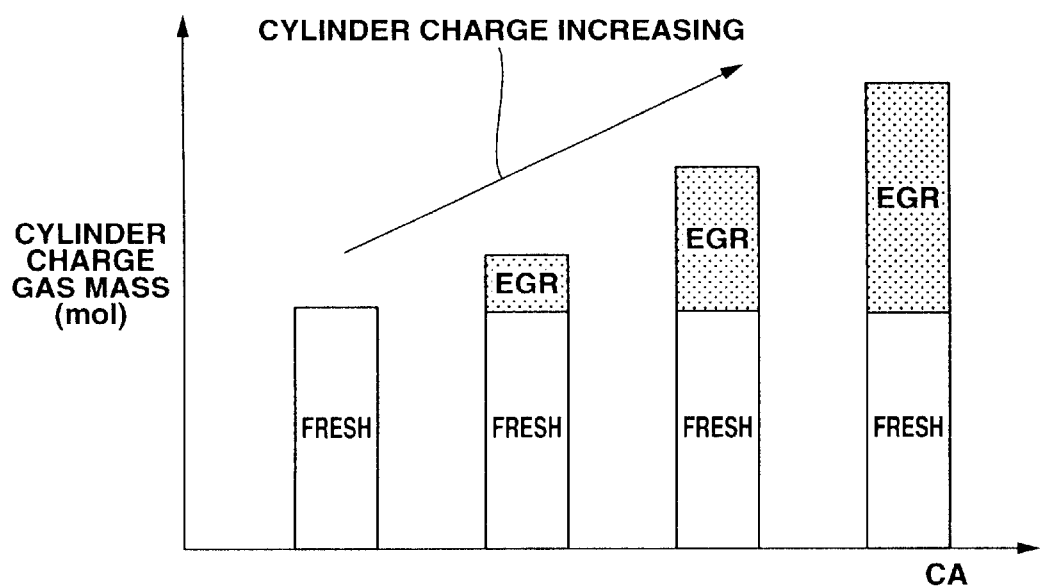
FIG. 8(B) shows the relationship between CA and cylinder charge mass, graphically illustrating the trend of cylinder content for the same number of engine cycles after initiation of auto-ignition combustion mode when trap valve is open in the compression stroke after the valve closure of intake valve.

With reference to FIGS. 8(A) and 8(B), as mentioned before, the mass of fresh charge of air and fuel mixture depends on the valve timing of trap valve 44 is discussed below.

In FIGS. 8(A) and 8(B), the vertical axis represents cylinder charge gas mass (mol), i.e., the mass of cylinder content G, and the horizontal axis represents crank angle (CA). In each of the illustrated rectangles, the mass of residual gas is indicated by condensed distribution of dots and labeled "EGR", and the mass of fresh charge is labeled "FRESH".

FIG. 8(A) illustrates the trend of cylinder content over a number of engine cycles immediately after initiation of auto-ignition combustion mode when trap valve 44 is open over the last portion of the induction stroke of each engine cycle and the initial portion of the subsequent compression stroke. FIG. 8(B) illustrates the trend of cylinder content over the sane number of engine cycles immediately after initiation of auto-ignition combustion mode when trap valve 44 is open in the compression stroke after the valve closure of intake valve 16. In the case of FIG. 8(A), there is the valve overlap between intake valve 16 and trap valve 44. A considerable transfer of heat from the trapped residual gas to the intake air has occurred. Such heat transfer causes an increase in volume of intake air, resulting in a reduction of mass of fresh charge over engine cycles. However, in the case of FIG. 8(A) where trap valve 44 is open in the compression stroke after the valve closure of intake valve 16, the mass of fresh charge remains unaltered. It will be appreciated that, without any reduction, in mass, of fresh charge, auto-ignition timing can be controlled by the use of trapped residual gas in the embodiments according to the present invention. It will be also appreciated that, with the mass of fresh charge unaltered, the mass of cylinder content G is increased. As mentioned before in connection with the mass ratio G/F, increase of the mass G with the mass of fresh charge unaltered is advantageous in expanding the useful auto-ignition combustion operating region of load and engine speed relationship.

Figure 9:
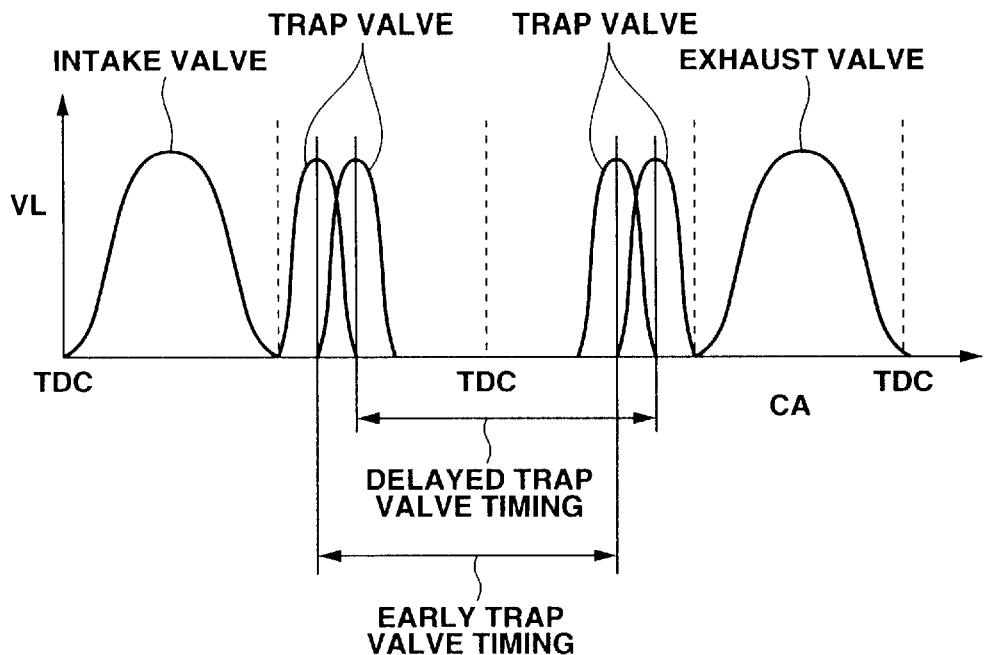
FIG. 9 is a valve lift diagram of one engine cycle, illustrating an early trap valve timing and a delayed trap valve timing between which the trap valve timing moves to advance or retard the valve opening when the engine is operable in auto-ignition combustion operating region of different load and engine speed relationships.
Figure 10:
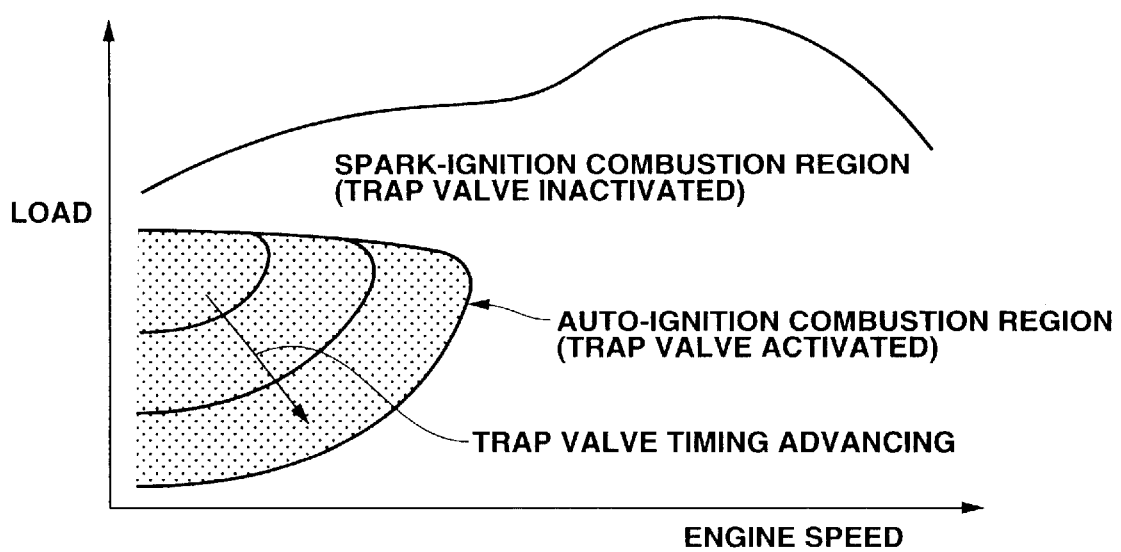
FIG. 10 is a load-speed characteristic for the engine, wherein an area filled with dots indicates the auto-ignition combustion operating region.

With reference to FIGS. 9 and 10, it is now discussed on the manner of precise control of auto-ignition when the engine is operable in an operating region of different loads or of different engine speeds or of different load and engine speed relationships.

With reference also to FIG. 1, in an embodiment, auto-ignition support controller 50 receives information as to engine load from engine control unit 30. Auto-ignition becomes difficult during engine operation with low load, requiring more assist to promote auto-ignition by increasing transfer of energy from the trapped residual gas to the fresh charge. Such assist can be increased by advancing the valve opening angle of trap valve 44 in the compression stroke. In the embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap valve timing in FIG. 9 under the control of controller 50. Controller 50 determines the appropriate trap valve timing based on load. In other words, when engine 12 is operable in an operating region of different loads, the valve opening angle of trap valve 44 is variably advanced with decreasing of the different loads, thereby causing trap valve 44 to vary transfer of energy from said trapped portion of residual gas to the cylinder in the compression stroke after the valve closure of intake valve 16.

In another embodiment, auto-ignition support controller 50 receives information as to engine speed from engine control unit 30. Auto-ignition becomes difficult during engine operation at high engine speeds, requiring more assist to promote auto-ignition by increasing transfer of energy from the trapped residual gas to the fresh charge. Such assist can be increased by advancing the valve opening angle of trap valve 44 in the compression stroke. In the embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap-valve timing in FIG. 9 under the control of controller 50. Controller 50 determines the appropriate trap valve timing based on engine speed. In other words, when engine 12 is operable in an operating region of different engine speeds, the valve opening angle of trap valve 44 is variably advanced with increasing of the different engine speeds, thereby causing trap valve 44 to vary transfer of energy of said trapped portion of residual gas to cylinder 14 in the compression stroke after valve closure of intake valve 16.

In still another embodiment, auto-ignition support controller 50 receives information as to engine load from engine control unit 30. As mentioned-before, auto-ignition becomes difficult during engine operation with low load, requiring more assist to promote auto-ignition by increasing transfer of energy from the trapped residual gas to the fresh charge. In this embodiment, such assist can be increased by advancing the valve opening angle of trap valve 44 in the power stroke so as to increase energy of heat and pressure of trapped residual gas within trap chamber 46. In the embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap valve timing in FIG. 9 under the control of controller 50. Controller 50 determines the appropriate trap valve timing based on load. In other words, when the engine is operable in an operating region of different loads, the valve opening angle of trap valve 44 is variably advanced with decreasing of the different loads, thereby causing trap valve 44 to vary in amount the escape of the portion of residual gas to trap chamber 46 from cylinder 14 in the power stroke before the valve opening angle of exhaust valve 20.

In further embodiment, auto-ignition support controller 50 receives information as to engine speed from engine control unit 30. As mentioned before, auto-ignition becomes difficult during engine operation at high engine speeds, requiring more assist to promote auto-ignition by increasing transfer of energy from the trapped residual gas to the fresh charge. In this embodiment, such assist can be increased by advancing the valve opening angle of trap valve 44 in the compression stroke. In the embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap valve timing in FIG. 9 under the control of controller 50. Controller 50 determines the appropriate trap valve timing based on speed. In other words, when engine 12 is operable in an operating region of different engine speeds, the valve opening angle of trap valve 44 is variably advanced with increasing of the different engine speeds, thereby causing trap valve 44 to vary in amount the escape of the portion of residual gas to trap chamber 46 from cylinder 14 in the power stroke before the valve opening angle of exhaust valve 20.

With continuing reference to FIG. 1, in other embodiment, auto-ignition support controller 50 receives information as to load and engine speed from engine control unit 30. Auto-ignition becomes difficult during engine operation with low load and/or at high engine speeds, requiring more assist to promote auto-ignition by increasing transfer of energy from the trapped residual gas to the fresh charge. Such assist can be increased by advancing the valve opening angle of trap valve 44 in the compression stroke. In this embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap valve timing in FIG. 9 under the control of controller 50. Controller 50 determines the appropriate trap valve timing based on-load and engine speed, for example, by using the map as illustrated in FIG. 10. In other words, when engine 12 is operable in an operating region of different load and engine speed relationships, controller 50 is effective to vary a control signal based upon the different load and engine speed relationships to cause valve actuator 52 to variably advance the valve opening angle of trap valve 44 with the different load and engine speed relationships, thereby causing trap valve 44 to vary transfer of energy of the trapped portion of residual gas to cylinder 14 in the compression stroke after the valve closure of intake valve 16.

In still other embodiment, auto-ignition support controller 50 receives information as to load and engine speed from engine control unit 30. As mentioned before, auto-ignition becomes difficult during engine operation with low load and/or at high engine speeds, requiring more assist to promote auto-ignition by increasing transfer of energy from the trapped residual gas to the fresh charge. In this embodiment, such assist can be increased by advancing the valve opening angle of trap valve 44 in the power stroke so as to increase energy of heat and pressure of trapped residual gas within trap chamber 46. In the embodiment, valve actuator 52 advances the valve opening angle of trap valve 44 in the compression stroke by moving the valve timing of trap valve 44 in a direction from the illustrated delayed trap valve timing in FIG. 9 toward the illustrated early trap valve timing in FIG. 9 under the control of controller 50. Controller 50 determines the appropriate trap valve timing based on load and engine speed, for example, by using the map illustrated in FIG. 10. In other words, when engine 12 is operable in an operating region of different load and engine speed relationships, controller 50 is effective to vary a control signal based upon the different load and engine speed relationships to cause valve actuator 52 to variably advance the valve opening angle of trap valve 44 with the different load and engine speed relationships, thereby causing trap valve 44 to vary in amount the escape of the portion of residual gas to trap chamber 46 from cylinder 14 in the power stroke before the valve opening angle of exhaust valve 20.

Figure 11:
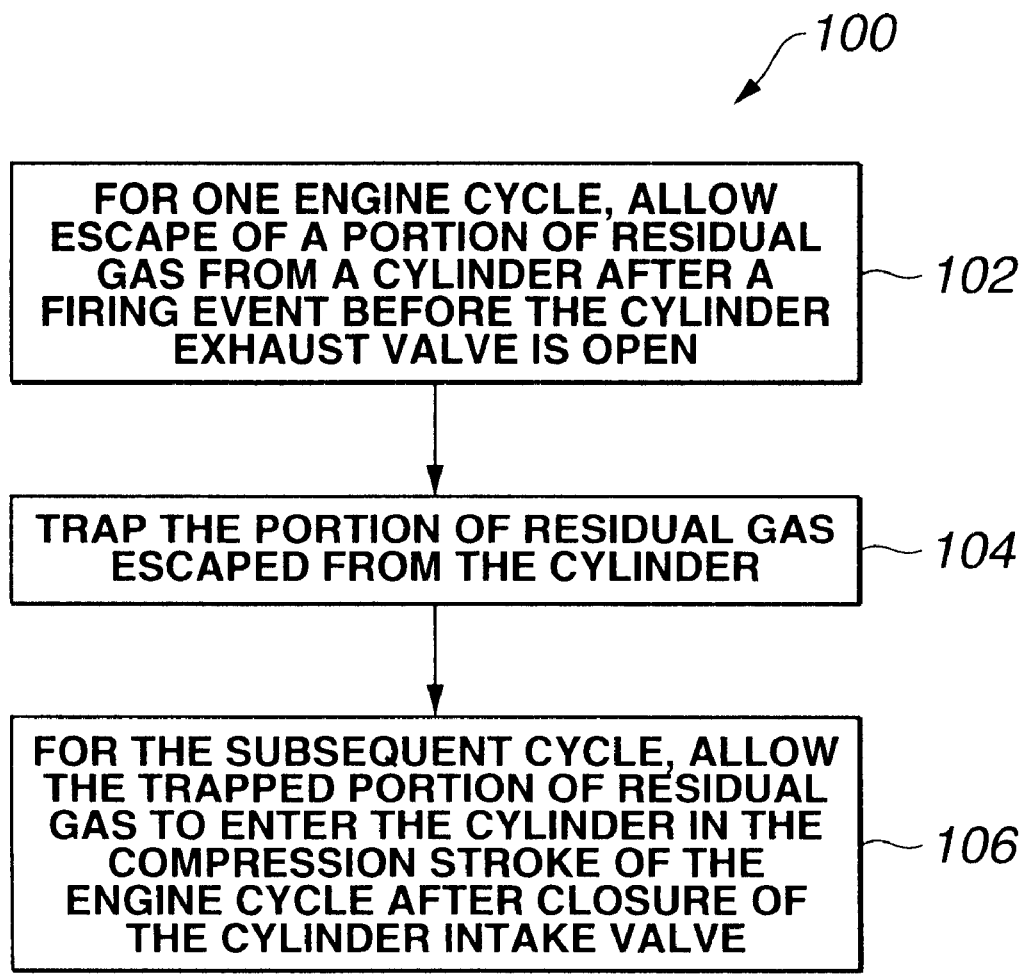
FIG. 11 is a flow diagram illustrating an auto-ignition support method of the present invention.

With reference to FIG. 11, a method of the present invention for auto-ignition support is generally indicated at 100. At block 102, for one engine cycle, escape of a portion of residual gas from cylinder 14 is allowed during the power stroke before exhaust valve 20 is open. At block 104, the portion of residual gas escaped from cylinder 14 is trapped. At block 106, for the subsequent engine cycle, the trapped portion of residual gas is allowed to enter the cylinder in the compression stroke of the engine cycle after valve closure of intake valve 16.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-70201, filed Mar. 13, 2001, the disclosure of which is hereby incorporated by reference in its entirety.

What is claimed is:

1. An auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:

a device communicably coupled with the cylinder, effective to allow an amount of gas to enter the cylinder in the compression stroke of an engine cycle after valve closure of the intake valve, said gas being higher in temperature than the air that is allowed to enter the cylinder when the intake valve is open.

2. An auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:

a gas trap including a trap valve, and a trap chamber selectively communicable with the cylinder through a port when said trap valve is open; and a valve actuator which selectively actuates said trap valve, said valve actuator being effective to selectively open said trap valve to allow escape of a portion of residual gas from the cylinder to said trap chamber in the power stroke of one engine cycle before valve opening angle of the exhaust valve and to trap said portion of residual gas escaped from the cylinder, said valve actuator being further effective to selectively open said trap valve to allow said trapped portion of residual gas to enter the cylinder in the compression stroke of the subsequent engine cycle after valve closure of the intake valve.

3. The auto-ignition support system as claimed in claim 2, wherein the engine is operable in an operating region of different loads, and wherein valve opening angle of said trap valve is variably advanced with decreasing of the different loads, thereby causing said trap valve to vary transfer of energy of said trapped portion of residual gas to the cylinder in the compression stroke after valve closure of the intake valve.

4. The auto-ignition support system as claimed in claim 2, wherein the engine is operable in an operating region of different engine speeds, and wherein valve opening angle of said trap valve is variably advanced with increasing of the different engine speeds, thereby causing said trap valve to vary transfer of energy of said trapped portion of residual gas to the cylinder in the compression stroke after valve closure of the intake valve.

5. The auto-ignition support system as claimed in claim 2, wherein the engine is operable in an operating region of different loads, and wherein valve opening angle of said trap valve is variably advanced with decreasing of the different loads, thereby causing said trap valve to vary in amount the escape of the portion of residual gas to said trap chamber from the cylinder in the power stroke before valve opening angle of the exhaust valve.

6. The auto-ignition support system as claimed in claim 2, wherein the engine is operable in an operating region of different engine speeds, and wherein valve opening angle of said trap valve is variably advanced with increasing of the different engine speeds, thereby causing said trap valve to vary in amount the escape of the portion of residual gas to said trap chamber from the cylinder in the power stroke before valve opening angle of the exhaust valve.

7. An auto-ignition support method for an internal combustion engine including a cylinder including at least one intake valve which is selectively open to allow at least air to enter the cylinder and at least one exhaust valve which is selectively open to allow residual gas escape from the cylinder after a firing event, the method comprising:
  for one engine cycle, allowing escape of a portion of residual gas from the cylinder during the power stroke before the exhaust valve is open;
  trapping said portion of residual gas escaped from the cylinder; and
  for the subsequent engine cycle, allowing said trapped portion of residual gas to enter the cylinder in the compression stroke after valve closure of the intake valve.

8. The auto-ignition support method as claimed in claim 7, further comprising:
  measuring engine speed of the engine;
  measuring load of the engine; and
  varying, in amount, said trapped portion of residual gas to be allowed to enter the cylinder with different load and engine speed relationships.

9. The auto-ignition support method as claimed in claim 7, further comprising:
  measuring engine speed of the engine;
  measuring load of the engine; and
  varying, in amount, said escape of the portion of residual gas from the cylinder with different load and engine speed relationships.

10. An auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:
  a gas trap including a trap valve, and a trap chamber selectively communicable with the cylinder through a port when said trap valve is open,
  a valve actuator which selectively actuates said trap valve,
  said valve actuator being effective to selectively open said trap valve to allow escape of a portion of residual gas from the cylinder to said trap chamber in the power stroke of one engine cycle before valve opening angle of the exhaust valve and to trap said portion of residual gas escaped from the cylinder,
  said valve actuator being further effective to selectively open said trap valve to allow said trapped portion of residual gas to enter the cylinder in the compression stroke of the subsequent engine cycle after valve closure of the intake valve; and
  a controller which is communicably coupled to said valve actuator, said controller being effective to selectively communicate a control signal to said valve actuator.

11. The auto-ignition support system as claimed in claim 10,
  wherein said valve actuator is effective to selectively open said trap valve for a first crank angle duration, in the power stroke of the one engine cycle before valve opening angle of the exhaust valve, when there is a pressure gradient causing creation of a gas flow from the cylinder toward said trap chamber; and
  wherein said valve actuator is further effective to selectively open said trap valve for a second crank angle duration, in the compression stroke of the subsequent engine cycle after valve closure of the intake valve, when there is another pressure gradient causing creation of a gas flow from the trap chamber to the cylinder.

12. The auto-ignition support system as claimed in claim 11, wherein the engine is operable in an operating region of different loads, and wherein said controller is effective to vary said control signal based upon the different loads to cause said valve actuator to variably advance valve opening angle of said trap valve of the second crank angle duration with decreasing of the different loads, thereby causing said trap valve to vary transfer of energy of said trapped portion of residual gas to the cylinder in the compression stroke after valve closure of the intake valve.

13. The auto-ignition support system as claimed in claim 11, wherein the engine is operable in an operating region of different engine speeds, and wherein said controller is effective to vary said control signal based upon the different engine speeds to cause said valve actuator to variably advance valve opening angle of said trap valve of the second crank angle duration with increasing of the different engine speeds, thereby causing said trap valve to vary transfer of energy of said trapped portion of residual gas to the cylinder in the compression stroke after valve closure of the intake valve.

14. The auto-ignition support system as claimed in claim 11, wherein the engine is operable in an operating region of different load and engine speed relationships, and wherein said controller is effective to vary said control signal based upon the different load and engine speed relationships to cause said valve actuator to variably advance valve opening angle of said trap valve of the second crank angle duration with the different load and engine speed relationships, thereby causing said trap valve to vary transfer of energy of said trapped portion of residual gas to the cylinder in the compression stroke after valve closure of the intake valve.

15. The auto-ignition support system as claimed in claim 11, wherein the engine is operable in an operating region of different loads, and wherein said controller is effective to vary said control signal based upon the different loads to cause said valve actuator to variably advance valve opening angle of said trap valve of the first crank angle duration with decreasing of the different loads, thereby causing said trap valve to vary in amount the escape of the portion of residual gas to said trap chamber from the cylinder in the power stroke before valve opening angle of the exhaust valve.

16. The auto-ignition support system as claimed in claim 11, wherein the engine is operable in an operating region of different engine speeds, and wherein said controller is effective to vary said control signal based upon the different engine speeds to cause said valve actuator to variably advance valve opening angle of said trap valve of the first crank angle duration with increasing of the different engine speeds, thereby causing said trap valve to vary in amount the escape of the portion of residual gas to said trap chamber from the cylinder in the power stroke before valve opening angle of the exhaust valve.

17. The auto-ignition support system as claimed in claim 11, wherein the engine is operable in an operating region of different load and engine speed relationships, and wherein said controller is effective to vary said control signal based upon the different load and engine speed relationships to cause said valve actuator to variably advance valve opening angle of said trap valve of the first crank angle duration with the different load and engine speed relationships, thereby causing said trap valve to vary in amount the escape of the portion of residual gas to said trap chamber from the cylinder in the power stroke before valve opening angle of the exhaust valve.

18. An auto-ignition support system for an internal combustion engine including a cylinder including at least one intake valve which is selectively open to allow at least air to enter the cylinder and at least one exhaust valve which is selectively open to allow residual gas escape from the cylinder after a firing event, the system comprising:

means for allowing an amount of gas to enter the cylinder in the compression stroke of an engine cycle after valve closure of the intake valve, said gas being higher in temperature than the air that is allowed to enter the cylinder when the intake valve is open.

* * * * *